United States Patent
Johnson

(10) Patent No.: US 8,458,668 B1
(45) Date of Patent: *Jun. 4, 2013

(54) IGNORING OUTPUT ARGUMENTS OF FUNCTIONS IN PROGRAMMING ENVIRONMENTS

(75) Inventor: Steve Johnson, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,667

(22) Filed: Jan. 3, 2012

Related U.S. Application Data

(63) Continuation of application No. 12/570,516, filed on Sep. 30, 2009, now Pat. No. 8,112,741, which is a continuation of application No. 11/102,532, filed on Apr. 8, 2005, now Pat. No. 7,673,289.

(51) Int. Cl.
*G06F 9/44* (2006.01)

(52) U.S. Cl.
USPC .......................................... 717/126

(58) Field of Classification Search
USPC .......................................... 717/126
See application file for complete search history.

(56) References Cited

U.S. PATENT DOCUMENTS

| | | | |
|---|---|---|---|
| 5,307,493 A | | 4/1994 | Gusenius |
| 5,742,738 A | * | 4/1998 | Koza et al. ................. 706/13 |
| 6,058,385 A | * | 5/2000 | Koza et al. ................. 706/13 |
| 6,766,348 B1 | | 7/2004 | Combs et al. |
| 7,414,626 B1 | * | 8/2008 | Picott ......................... 717/157 |
| 7,454,746 B2 | | 11/2008 | Micco et al. |
| 2003/0056203 A1 | | 3/2003 | Micco et al. |
| 2003/0149799 A1 | * | 8/2003 | Shattuck et al. ............. 709/318 |
| 2004/0006762 A1 | | 1/2004 | Stewart et al. |
| 2007/0150871 A1 | | 6/2007 | Barsness et al. |
| 2007/0283331 A1 | | 12/2007 | Pietrek |
| 2008/0098349 A1 | | 4/2008 | Lin et al. |
| 2008/0295080 A1 | | 11/2008 | Shinomi |

OTHER PUBLICATIONS

"MATLAB: The Language of Technical Computing," Programming Version 7, The MathWorks, Inc., Mar. 2005, pp. i-xx, 4-1 to 4-44, 5-1 to 5-34, Index-1 to Index-24.

JARVI, "Proposal for Adding Tuple Types into the Standard Library," Indiana University, Sep. 10, 2002, all pages.

"MATLAB C++ Math Library," The MathWorks, Inc., Jan. 1999, all pages.

* cited by examiner

*Primary Examiner* — Wei Zhen
*Assistant Examiner* — Junchun Wu
(74) *Attorney, Agent, or Firm* — Cesari and McKenna, LLP; Michael R. Reinemann

(57) ABSTRACT

Methods, systems and computer program products are provided for ignoring one or more output arguments of a function in a programming environment. Users or programmers may designate one or more output arguments that are not desired by the users. The called function determines which output arguments are designated by the users. The one or more output arguments designated by the users are ignored by the function. The called function may reclaim memory space for the output arguments designated by the users. The called function may also avoid operations for generating values for the output arguments designated by the users. The called function does not need to return values for the output arguments designated by the users.

28 Claims, 4 Drawing Sheets

IGNORING OUTPUT ARGUMENTS OF FUNCTIONS IN PROGRAMMING ENVIRONMENTS

REFERENCE TO RELATED APPLICATION

This application is a continuation of U.S. patent application Ser. No. 12/570,516, which was filed on Sep. 30, 2009, by Steve Johnson entitled Ignoring Output Arguments of Functions in Programming Environments, now U.S. Pat. No. 8,112,741, which is a continuation of U.S. patent application Ser. No. 11/102,532, which was filed on Apr. 8, 2005, by Steve Johnson entitled Ignoring Output Arguments of Functions in Programming Environments, now U.S. Pat. No. 7,673,289, which applications are hereby incorporated by reference in their entireties.

FIELD OF THE INVENTION

The present invention relates generally to programming environments, and more particularly to methods, systems and computer program products for ignoring one or more output arguments of functions in the programming environments.

BACKGROUND OF THE INVENTION

Many programming languages, such as C, c++ and Java, allow a function to take a variable number of input arguments, but these languages only allow the function to return a single value. Some languages, such as MATLAB®, allow functions to return more than one value. For example, a function provided in MATLAB® programming environments may return both the eigenvalues and eigenvectors of a matrix, or an approximation function may return both the coefficients of the approximation and an estimate of the accuracy of the approximation. This feature is valuable in mathematical functions as well as more general situations.

In conventional MATLAB® programming environments, when a function is called, the function may query to ask how many input arguments and output arguments it was called with. The function may return as many output arguments as defined, but if the caller of the function has supplied fewer output arguments than the function can return, the excess output arguments are ignored by the function, and the memory space for the excess output arguments is reclaimed. This works if the desired output arguments come at the beginning of the function's output argument list. At times, however, some output arguments that come at the beginning of the function's output argument list are not desired and other output arguments that come later are desired.

As an example, MATLAB® programming environments provide a sort function, as described below. The sort function can return two output arguments including a sorted vector and a permutation used to sort an input vector. At times, only the permutation is desired. In conventional MATLAB®-based programming environments, a temporary array (Temp) is created to hold the sorted vector:

[Temp,I]=sort(V);

An easy programming error in using a temporary array is to forget to clear the temporary array, which means that the memory space taken by the temporary arrays may be wasted. The programming environment, or some programs that analyze other programs looking for errors, may check whether a temporary array is assigned to and not used. While this helps the programmer remember to clear the temporary array, clearing the temporary array may draw another message that the value assigned to the temporary array has never been used. Furthermore, the sort program may perform extra operations to produce values for the temporary array, which will not be used.

SUMMARY OF THE INVENTION

The present invention provides a programming environment in which a function is called with multiple output arguments and the called function returns values for the multiple output arguments. The present invention enables users or programmers to designate one or more output arguments that are not desired by the users. The present invention enables the function to determine which output arguments are designated by the users. The one or more output arguments designated by the users are ignored by the function. The function may reclaim memory space allocated for the output arguments designated by the users. The function may also be inhibited from generating values for the output arguments designated by the users. The function does not return values for the output arguments designated by the users.

In accordance with one aspect of the present invention, a method is provided for ignoring one or more output arguments of a function in a programming environment. The method includes the step of providing a caller, wherein the caller calls a function with a plurality of output arguments. The method also includes the step of enabling users to designate one or more output arguments from the plurality of outputs arguments, wherein the function does not return to the caller the one or more output arguments designated by the users.

In accordance with one aspect of the present invention, a system is provided for ignoring one or more output arguments of a function in a programming environment. The system includes a user interface for enabling users to create a caller, wherein the caller calls a function with a plurality of output arguments. The system also includes a designator for enabling the users to designate one or more output arguments from the plurality of outputs arguments, wherein the function does not return to the caller the one or more output arguments designated by the users.

In another aspect of the present invention, a computer program product is provided for holding instructions executed in a computational device for a method for ignoring one or more output arguments of a function in a programming environment. The method includes the step of providing a caller, wherein the caller calls a function with a plurality of output arguments. The method also includes the step of enabling users to designate one or more output arguments from the plurality of outputs arguments, wherein the function does not return to the caller the one or more output arguments designated by the users.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
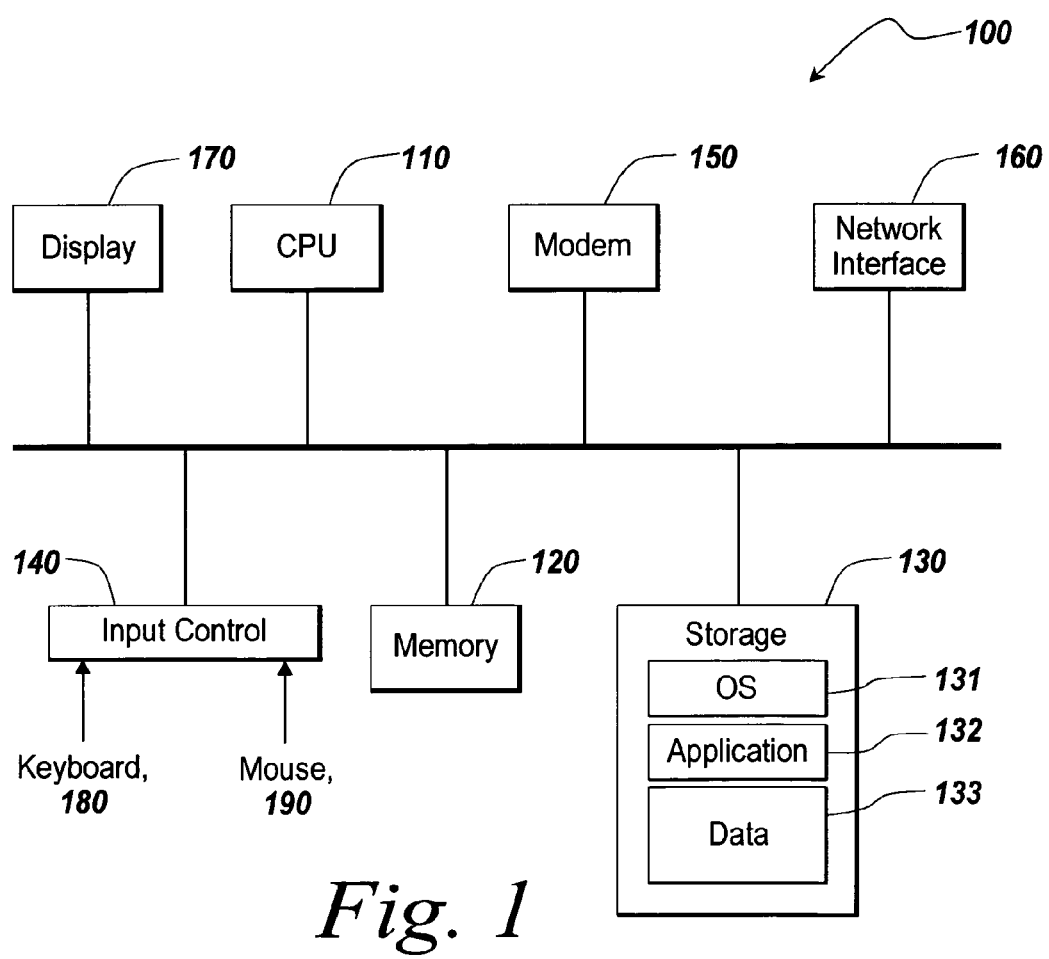
FIG. 1 is an exemplary computational device suitable for practicing the illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a programming environment in which a caller calls a function with a plurality of output arguments. The caller may include a program routine, a subroutine, a function, a command, etc. The function may or may not take one or more input arguments and returns a plurality of output arguments. An exemplary programming environment that provides a function returning values for a plurality of output arguments can be found in MATLAB® from The Math Works, Inc. of Natick, Mass.

MATLAB® is an intuitive high performance language and technical computing environment. MATLAB® provides mathematical and graphical tools for data analysis, visualization and application development. MATLAB® integrates computation and programming in an easy-to-use environment where problems and solutions are expressed in familiar mathematical notation. MATLAB® is an interactive system whose basic data element is an array that does not require dimensioning. This allows users to solve many technical computing problems, especially those with matrix and vector formulations, in a fraction of the time it would take to write a program in a scalar non-interactive language, such as C and FORTRAN.

The illustrative embodiment will be described solely for illustrative purposes relative to a MATLAB® programming environment. Although the illustrative embodiment will be described relative to MATLAB® programming environment, one of ordinary skill in the art will appreciate that the present invention may apply to other programming environments as long as the programming environments provides functions returning values for a plurality of output arguments.

In the illustrative embodiment of the present invention, a function is called with a plurality of output arguments. The illustrative embodiment of the present invention enables users or programmers to designate one more output arguments that are not desired by the users. The illustrative embodiment also enables the function to determine which output arguments are designated by the users. The one or more output arguments designated by the users are ignored by the called function. The called function may reclaim memory space for the output arguments designated by the users. The called function may also avoid operations for generating the output arguments designated by the users. The called function does not return values for the output arguments designated by the users.

FIG. 1 is an exemplary computational device 100 suitable for practicing the illustrative embodiment of the present invention, which provides a programming environment. One of ordinary skill in the art will appreciate that the computational device 100 is intended to be illustrative and not limiting of the present invention. The computational device 100 may take many forms, including but not limited to a workstation, server, network computer, quantum computer, optical computer, bio computer, Internet appliance, mobile device, a pager, a tablet computer, and the like.

The computational device 10 may be electronic and include a Central Processing Unit (CPU) 110, memory 120, storage 130, an input control 140, a modem 150, a network interface 160, a display 170, etc. The CPU 110 controls each component of the computational device 100 to provide the programming environment. The memory 120 temporarily stores instructions and data and provides them to the CPU 110 so that the CPU 110 operates the computational device 100 and runs a programming environment. The storage 130 usually contains software tools for applications. The storage 130 includes, in particular, code 131 for the operating system (OS) of the device 100, code 132 for applications running on the operation system including applications for providing the programming environment, and data 133 for the programs and functions running in the programming environment.

The input control 140 may interface with a keyboard 180, a mouse 190, and other input devices. The computational device 100 may receive through the input control 140 input data necessary for creating and running programs and functions in the programming environment. The computational device 100 may display in the display 170 user interfaces for the users to create or edit or run the programs and functions in the programming environment.

Figure 2:
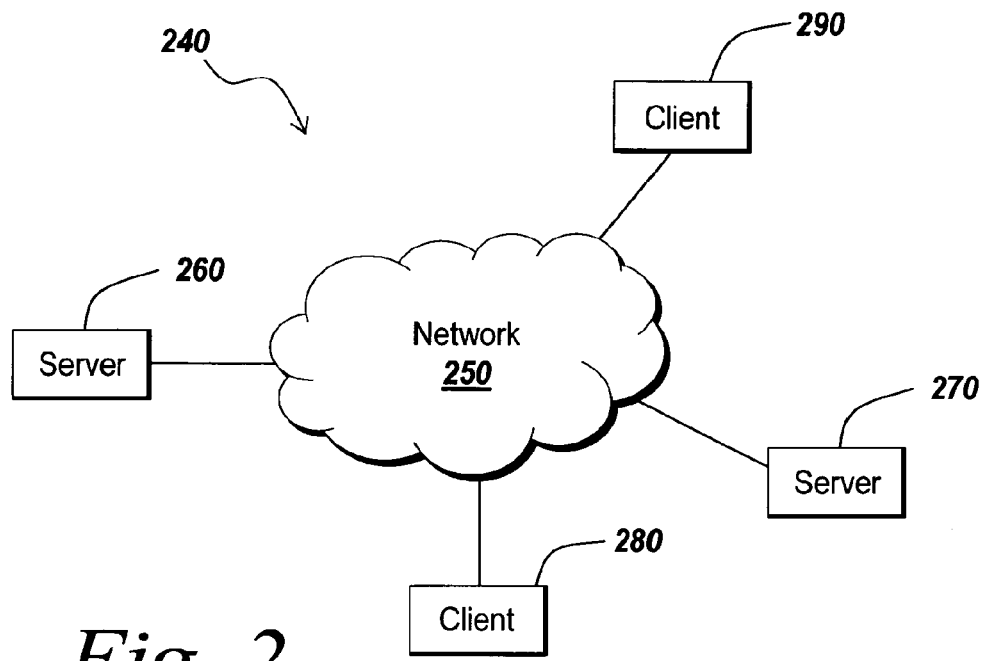
FIG. 2 is an exemplary network environment that enables a distributed implementation of the present invention.

FIG. 2 is an exemplary network environment 240 suitable for the distributed implementation of the illustrative embodiment. The network environment 240 may include one or more servers 260 and 270 coupled to clients 280 and 290 via a communication network 250. The servers 260 and 270 and clients 280 and 290 can be implemented using the computational device 100 depicted in FIG. 1. The network interface 160 and the modem 150 of the computational device 100 enable the servers 260 and 270 to communicate with the clients 280 and 290 through the communication network 250. The communication network 250 may include Internet, intranet, LAN (Local Area Network), WAN (Wide Area Network), MAN (Metropolitan Area Network), etc. The communication facilities can support the distributed implementations of the present invention.

In the network environment 240, the servers 260 and 270 may provide the clients 280 and 290 with software components or products under a particular condition, such as a license agreement. The software components or products may include those for providing a programming environment. The software components or products may also include programs and functions running in the programming environment. The clients 280 and 290 may create a command or program and request the servers 260 and 270 to run the command or program. The servers 260 and 270 may receive a command or program from the clients 280 and 290, run the command or program on the server 260 and 270, and provide the clients 280 and 290 with the results of running the command or program.

Figure 3:
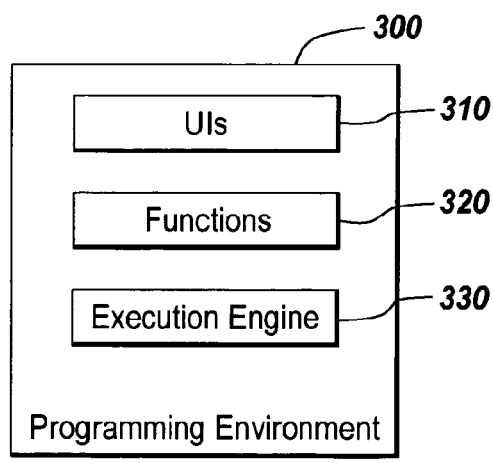
FIG. 3 is an exemplary programming environment provided in the illustrative embodiment of the present invention.

FIG. 3 is an exemplary programming environment 300 provided in the illustrative embodiment of the present invention. The programming environment 300 may include user interfaces (DIs) 310 and an execution engine 330. The execution engine 330 may interpret and compile programs and enable the programs to run in the programming environment 300. The execution engine 330 may provide functions 320 for executing the programs in the programming environment 300. For example, MATLAB® Run-Time Libraries provide functions, such as arithmetic operator functions, complex number functions, exponential functions, input and output functions, logical operator functions, matrix/array functions, relational operator functions, signal processing functions, string functions, etc., that enable MATLAB® programs to run in the MATLAB® programming environment. One of ordinary skill in the art will appreciate that users or programmers can create their own functions in the programming environment 300.

Generally, the functions 320 may or may not take input arguments. Some functions return no output argument, some return just one output argument, and some return multiple output arguments. The functions 320 may be called by program routines, subroutines, and other functions. The functions 320 may also be called by a command entered by users in a command line of the programming environment 300.

Figure 4A:
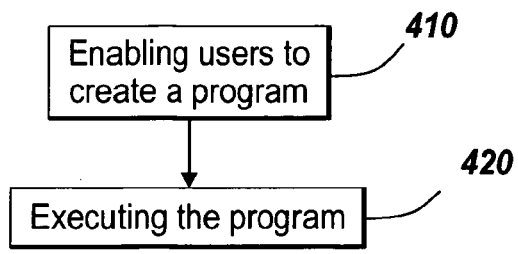
FIGS. 4A and 4B are flow charts illustrating an exemplary operation for creating and executing a program that calls a function.

FIG. 4A is a flow chart illustrating an exemplary operation for creating and executing a program in the programming environment 300. Although the illustrative embodiment is described relative to a program calling a function, one of ordinary skill in the art will appreciate that the present invention may apply to other types of callers, such as a command, in other embodiments.

The programming environment 300 enables users or programmers to create a program in the programming environment 300 (step 410). The programming environment 300 includes user interfaces (UIs) 310 for enabling the users to create a program in the programming environment.300. The UIs 310 may be provided in an editor. Users can type in program code using the UIs 310 provided in the editor.

The users may create the program to include a call to a function that returns multiple output arguments. For example, in the MATLAB®-based programming environments, the program may call a sort function that takes an input argument (V) and returns two output arguments including the sorted vector (S) and the permutation (I) used to sort the input vector (V), as described below.

[S,I]=sort(V)

V is the input vector to be sorted, S is the output sorted vector, and I is the output index vector giving the permutation produced by the sort.

The illustrative embodiment provides a designator or operator that enables the users to designate one or more output arguments that are not desired by the users. The designator or operator may include some syntax that is not legal in the context of an output argument. For example, in most programming languages, the minus (−) or tilde (~) sign standing by itself is not a legal output argument. In the illustrative embodiment, the tilde (~) sign is used to designate an output argument that is not desired by the users, as described below.

[~,I] sort(V);

In this example, the tilde (~) sign is used to indicate that the sorted vector (S) is not desired by the users.

Those of ordinary skill in the art will appreciate that the tilde (~) sign is an exemplary designator or operator and different types of designators or operators can be used in other embodiments. The exact choice of the designator or operator is a matter of language design that, in general, will depend on the details of the language and the taste of the designer.

The editor may enable the user to save the program in the storage 130. In the MATLAB® programming environment, the program can be saved as M-files, which have .m extensions. The programming environment 300 may also include an execution engine 330 for executing the program in the programming environment 300 (step 420). In the MATLAB® programming environment, typing the name of an M-file at the MATLAB® command prompt invokes the execution engine 330 to run the program. Also, in the MATLAB® programming environment, typing the name of a function with input and output arguments at the MATLAB® command prompt invokes the execution engine 330 to run the function directly.

The execution engine 330 may compile and execute the program in the programming environment 300. The execution engine 330 may interpret the program and convert it to a format that can be executed in the programming environment 300. To enable the program to be executed in the programming environment 300, the execution engine 300 may allocate memory space for the variables used in the program. If a function is called in the program, the execution engine 300 may allocate memory space for the input and output arguments of the function. One of ordinary skill in the art will appreciate that memory space may also be allocated for the variables used in the function. The memory space for the variables in the function may be allocated in its own workspace or in the same workspace as the program that calls the function.

Figure 4B:
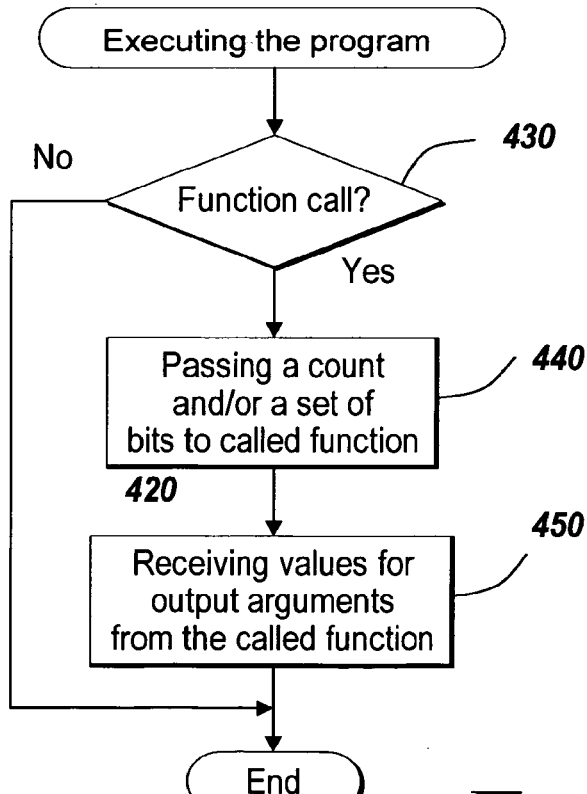

FIG. 4B is a flow chart illustrating an exemplary operation for executing a program calling a function in the programming environment 300. If a function is called by a program or a command (step 430), the function may query how many input arguments and output arguments it is called with. The execution engine 330 may pass to the function a count indicating the number of output arguments expected. If an output argument is designated with the tilde (~) sign, this output argument is not included in the number of output arguments expected. In addition to this count, or instead of it, the execution engine 330 may send a set of bits associated with the output arguments, with a bit being one if the output argument is present and zero if the output argument is designated with the tilde (~) sign. This enables the called function to quickly check whether the output argument is present, and whether the memory space for the output argument that is not present is reclaimed.

One of skill in the art will appreciate that the count and/or a set of bits are illustrative methods for transmitting information to the called function and other methods for transmitting information to the called function may be used in other embodiments. In particular, different programming languages may have different preferred implementations, depending on the function calling conventions of the language, its implementation in a particular environment, and the syntactic choices for making it visible to the programmer.

Figure 5:
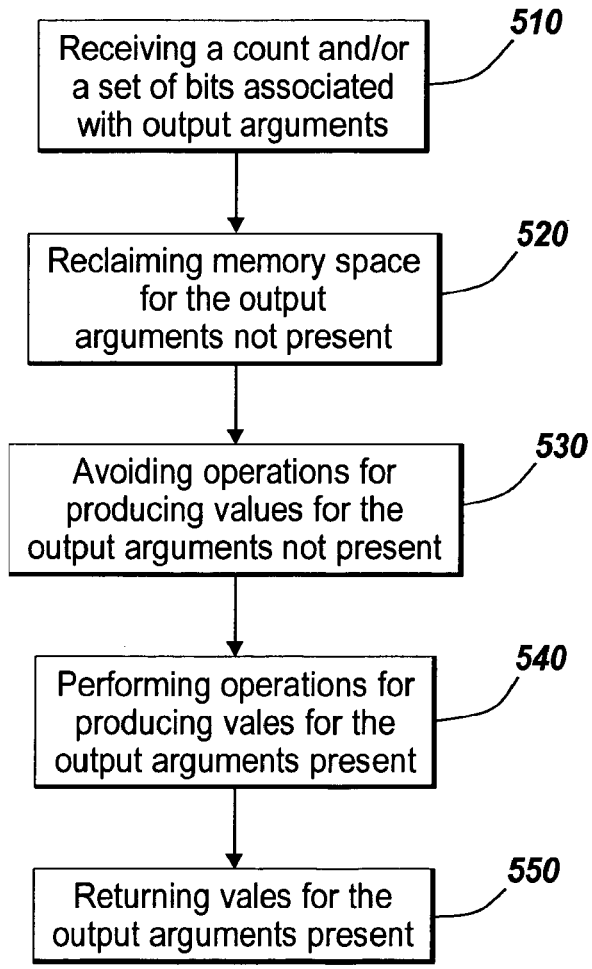
FIG. 5 is a flow chart illustrating an exemplary operation of a function called by a program or command in the illustrative embodiment.

FIG. 5 is a flow chart illustrating an exemplary operation of a function called by a program or command in the illustrative embodiment. If a function is called, the called function may query how many input argument and output arguments it is called with. The called function may also query which output arguments are present or designated with the tilde (~) sign. The called function receives a count indicating the number of output arguments expected. In addition to this count, or instead of it, the function may receive a set of bits associated with the output arguments, with a bit being one if the output argument is present and zero if the output argument is designated with the tilde (~) sign (step 510). Using the count and/or the set of bits associated with the output arguments, the called function may determine whether or not a particular argument is present. This determination can be done by adding syntax to the definition of the function or by adding another utility function that the called function can call.

As an example of adding syntax to the definition of the function, the called function may process a statement of the following form in the MATLAB® programming environment:

if ?out
<code to be executed if output variable out is present>
else
<code to be executed if output variable out is not present>
end The output arguments may be designated by name, by ordinal position, or any other manner that uniquely identifies the output arguments. The above-described statement refers to the output argument by name and tests for the presence of the output argument. Alternatively, a utility function may be called as follows.

if isOutMissing(i), . . .

This utility function refers to the output argument by position and tests whether it is missing. This utility function may return true if the i-th output argument is missing, and false otherwise. Based upon the determination on whether or not a particular argument is present, the called function may reclaim memory space allocated for the output arguments that are designated by the tilde (~) sign (step 520). In addition, the called function avoids performing the operations that produce values for the output arguments that are designated by the tilde (~) sign (step 530). The called function performs the operations for producing values for the output arguments that are present or not designated by the tilde (~) sign (step 540). Finally, the called function returns the values for the output arguments that are present or not designated by the tilde (~) sign, and does not return values for the output arguments that are designated by the tilde (~) sign (step 550). The program or command receives the values for the output arguments that are present or not designated by the tilde (~) sign, and the execution engine 330 continues to execute the rest of the program or command (step 450 in FIG. 4).

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any programming environment that provides a function call with multiple output arguments. Practitioners of the art will realize that the sequence of steps and architectures depicted in the figures may be altered without departing from the scope of the present invention and that the illustrations contained herein are singular examples of a multitude of possible depictions of the present invention.

I claim:

1. A non-transitory computer-readable storage medium storing computer-executable instructions, the medium storing one or more instructions for:
   providing first code that includes a function defined to perform a plurality of operations for generating a plurality of output arguments;
   providing second code that includes a caller calling the function, the caller designating, with a predefined designator, at least one of the plurality of output arguments to be ignored; and
   processing the first and second code such that one or more of the operations for generating the at least one of the plurality of output arguments to be ignored are avoided.

2. The non-transitory computer-readable storage medium of claim 1 further comprising one or more instructions for:
   processing the first code such that one or more allocated resources, associated with the at least one of the plurality of output arguments to be ignored, is reclaimed.

3. The non-transitory computer-readable storage medium of claim 2 wherein the one or more allocated resources includes memory space.

4. The non-transitory computer-readable storage medium of claim 1 wherein the first code is provided in a dynamically typed programming environment.

5. The non-transitory computer-readable storage medium of claim 1 wherein the predefined designator is a tilde (~) character.

6. The non-transitory computer-readable storage medium of claim 1 wherein the one or more instructions for processing the first and second code includes one or more instructions for:
   inhibiting the function from producing a value for the at least one of the plurality of output arguments to be ignored.

7. The non-transitory computer-readable storage medium of claim 1 wherein the caller is selected from the group consisting of:
   a program routine;
   a subroutine; and
   a user entered command.

8. The non-transitory computer-readable storage medium of claim 1 wherein
   the plurality of output arguments of the function are designated by name or by ordinal position, and
   the predefined designator is a missing output argument.

9. The non-transitory computer-readable storage medium of claim 1 wherein
   the first code complies with a programming language, and
   the predefined designator is not a legal syntax of the programming language for an output argument.

10. A computational device comprising:
    a memory that stores a function that is defined to perform a plurality of operations for generating a plurality of output arguments when the function is executed; and
    a processing element coupled to the memory, the processing element configured to:
      receive a call to the function, the call designating, with a predefined designator, at least one of the plurality of output arguments to be ignored;
      execute the call to the function; and
      execute the function such that one or more of the operations for generating the at least one of the plurality of output arguments to be ignored is avoided.

11. The computational device of claim 10 wherein the processing element is further configured to:
    execute the function such that one or more allocated resources, associated with the at least one of the plurality of output arguments to be ignored, is reclaimed.

12. The computational device of claim 11 wherein the one or more allocated resources includes memory space.

13. The computational device of claim 10 wherein the function is provided in a dynamically typed programming environment.

14. The computational device of claim 10 wherein the predefined designator is a tilde (~) character.

15. The computational device of claim 10 wherein the execution of the function includes:
    inhibiting the function from producing a value for the at least one of the plurality of output arguments to be ignored.

16. The computational device of claim 10 wherein the call is received from a caller and the caller is selected from the group consisting of:
- a program routine;
- a subroutine; and
- a user entered command.

17. The computational device of claim 10 wherein
- the plurality of output arguments of the function are designated by name or by ordinal position, and
- the predefined designator is a missing output argument.

18. The computational device of claim 10 wherein
- the function complies with a programming language; and
- the predefined designator is not a legal syntax of the programming language for an output argument.

19. A method comprising:
- storing, in a memory, first code that includes a function defined to perform a plurality of operations for generating a plurality of output arguments;
- providing second code that includes a caller calling the function, the caller designating, with a predefined designator, at least one of the plurality of output arguments to be ignored; and
- executing, by a processor coupled to the memory, the first and second code such that one or more of the operations for generating the at least one of the plurality of output arguments to be ignored are avoided.

20. The method of claim 19 further comprising:
- processing the first code such that one or more allocated resources, associated with the at least one of the plurality of output arguments to be ignored, is reclaimed.

21. The method of claim 20 wherein the one or more allocated resources includes memory space.

22. The method of claim 19 wherein the first code is provided in a dynamically typed programming environment.

23. The method of claim 19 wherein the predefined designator is a tilde (~) character.

24. The method of claim 19 wherein the executing the first and second code includes:
- inhibiting the function from producing a value for the at least one of the plurality of output arguments to be ignored.

25. The method of claim 19 wherein the caller is selected from the group consisting of:
- a program routine;
- a subroutine; and
- a user entered command.

26. The method of claim 19 wherein
- the plurality of output arguments of the function are designated by name or by ordinal position, and
- the predefined designator is a missing output argument.

27. The method of claim 19 wherein
- the first code complies with a programming language, and
- the predefined designator is not a legal syntax of the programming language for an output argument.

28. An apparatus comprising:
- means for providing first code that includes a function defined to perform a plurality of operations for generating a plurality of output arguments;
- means for providing second code that includes a caller calling the function, the caller designating, with a predefined designator, at least one of the plurality of output arguments to be ignored; and
- a processor configured to execute the first and second code such that one or more of the operations for generating the at least one of the plurality of output arguments to be ignored are avoided.

* * * * *